US009355559B1

(12) United States Patent
Bowen et al.

(10) Patent No.: US 9,355,559 B1
(45) Date of Patent: May 31, 2016

(54) MEDIA DEVICE CONTROL PROFILE SELECTION

(71) Applicant: AMAZON TECHNOLOGIES, INC., Reno, NV (US)

(72) Inventors: James Samuel Bowen, Cupertino, CA (US); Menashe Haskin, Palo Alto, CA (US); Daniel Christopher Bay, Santa Clara, CA (US); Edward Dietz Crump, Santa Cruz, CA (US)

(73) Assignee: Amazon Technologies, Inc., Reno, NV (US)

( * ) Notice: Subject to any disclaimer, the term of this patent is extended or adjusted under 35 U.S.C. 154(b) by 348 days.

(21) Appl. No.: 13/901,049

(22) Filed: May 23, 2013

(51) Int. Cl.
*G05B 11/01* (2006.01)
*G08C 19/28* (2006.01)
*G06F 1/32* (2006.01)
*G08C 17/00* (2006.01)
*H04L 29/08* (2006.01)
*H04L 29/06* (2006.01)
*H04W 76/02* (2009.01)
*H04W 88/06* (2009.01)

(52) U.S. Cl.
CPC .............. *G08C 19/28* (2013.01); *G06F 1/3206* (2013.01); *G08C 17/00* (2013.01); *H04L 29/06* (2013.01); *H04L 67/025* (2013.01); *H04L 67/16* (2013.01); *H04W 76/027* (2013.01); *H04W 88/06* (2013.01)

(58) Field of Classification Search
CPC combination set(s) only.
See application file for complete search history.

(56) References Cited

U.S. PATENT DOCUMENTS

| | | | | | |
|---|---|---|---|---|---|
| 4,322,842 | A | * | 3/1982 | Martinez | G05D 23/1905 340/12.5 |
| 7,620,703 | B1 | * | 11/2009 | Shteyn | H04L 12/2803 709/220 |
| 2002/0147819 | A1 | * | 10/2002 | Miyakoshi | H04L 29/06 709/228 |
| 2005/0162271 | A1 | * | 7/2005 | Leitch | G01S 5/0289 340/539.13 |
| 2006/0109138 | A1 | * | 5/2006 | Chiang | G08C 19/28 340/12.29 |
| 2008/0141329 | A1 | * | 6/2008 | Igoe | H04L 12/2809 725/141 |
| 2008/0165024 | A1 | * | 7/2008 | Gretton | G01C 21/3655 340/4.31 |
| 2008/0218087 | A1 | * | 9/2008 | Crouse | H05B 37/0245 315/131 |
| 2009/0092397 | A1 | * | 4/2009 | Taguchi | G08C 17/02 398/106 |
| 2009/0270030 | A1 | * | 10/2009 | Jia | H04B 1/1615 455/39 |
| 2009/0303097 | A1 | * | 12/2009 | Reams | H03J 1/0025 341/176 |
| 2009/0320055 | A1 | * | 12/2009 | Langille | H04H 20/42 725/14 |
| 2010/0315279 | A1 | * | 12/2010 | Hamai | G08C 17/02 341/176 |
| 2011/0074545 | A1 | * | 3/2011 | Yamada | H04N 5/4403 340/6.1 |
| 2011/0095873 | A1 | * | 4/2011 | Pratt | G08C 17/02 340/12.28 |
| 2011/0156862 | A1 | * | 6/2011 | Langer | G08B 21/24 340/4.37 |
| 2011/0304443 | A1 | * | 12/2011 | Sheridan | H04N 7/163 340/12.5 |
| 2012/0044061 | A1 | * | 2/2012 | Sakai | G08C 17/00 340/12.5 |
| 2012/0069772 | A1 | * | 3/2012 | Byrne | H04W 76/02 370/255 |
| 2012/0081212 | A1 | * | 4/2012 | Ishihara | H04L 12/12 340/10.4 |
| 2012/0127011 | A1 | * | 5/2012 | Lee | H04L 67/025 341/176 |
| 2012/0169482 | A1 | * | 7/2012 | Chen | G08C 17/02 340/12.52 |
| 2013/0026947 | A1 | * | 1/2013 | Economy | H05B 37/0272 315/287 |
| 2013/0067059 | A1 | * | 3/2013 | Gatta | H04L 12/12 709/224 |
| 2013/0067260 | A1 | * | 3/2013 | Gatta | G06F 1/3209 713/323 |
| 2014/0075464 | A1 | * | 3/2014 | McCrea | G06F 19/3418 725/14 |
| 2014/0148099 | A1 | * | 5/2014 | Reunamaki | H04W 52/0209 455/41.2 |
| 2014/0302783 | A1 | * | 10/2014 | Aiuto | H04W 52/16 455/41.2 |

* cited by examiner

*Primary Examiner* — Jennifer Mehmood
*Assistant Examiner* — Rufus Point
(74) *Attorney, Agent, or Firm* — Lindauer Law PLLC

(57) ABSTRACT

A remote control is used to control one or more media devices which may be in various media device states during operation. Based on media device state data, different media device control profiles may be applied. The media device control profiles may specify mapping of particular buttons on the remote control to particular functions on the media device, designate a communication path to use, and so forth.

20 Claims, 10 Drawing Sheets

200

| MEDIA DEVICE STATE DATA 122 ||||| 
|---|---|---|---|---|
| DEVICE ID 202 | DEVICE DESCRIPTION 204 | STATE DESCRIPTION 206 | PROXIMITY 208 | LAST UPDATED 210 |
| 108(1) | OS version 1.2.1123.1, EDID 001101100 | On, WiFi enabled, receiving control data from 108(5) | 2.3 m | 90 s |
| 108(2) | Model 9933AE | Off | 2.4 m | 300 s |
| 108(3) | OS version 2x33.10, Hardware B32D3 | Low power mode, receiving control data from 108(5) | 2.3 m | 27 s |
| 108(4) | Model 2003, Serial No. 291939391 | On, microphone disabled | 2.4 m | 65 s |
| 108(5) | Hardware v. 39301 | On, Bluetooth disabled, WiFi enabled | 2.4 m | 42 s |
| ⋮ |||||

FIG. 2

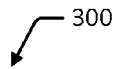

— 300

| MEDIA DEVICE CONTROL PROFILE 124 ||| 
|---|---|---|
| DEVICE ID 302 | ASSOCIATED STATE(S) 304 | CONTROL PROFILE 306 |
| 108(1) | Media device 108(1) in low power mode | set keepalive transmission to once every 3 minutes, send audio input to server 114; up arrow, next channel; down arrow, previous channel; … 306(1) |
| 108(1) | Media device 108(1) in regular power mode | set keepalive transmission to every 20 seconds, send audio input to 108(1) using WiFi; up arrow, next channel; down arrow, previous channel; … 306(2) |
| 108(2) | Media device 108(5) off | Media device 108(5) off, use IR direct control; up arrow, next chapter; down arrow, previous chapter; … 306(3) |
| 108(2) | Media device 108(5) on | Media device 108(5) on and configured to control device 108(2); use profile 306(7)… 306(4) |
| 108(3) | Media device 108(3) on, 108(5) off | Use IR control; up arrow, next song; down arrow, previous song; verbal "guide", display track listing… 306(5) |
| 108(4) | Remote control less than 7 meters from media device 108(4) | connect using Bluetooth; Up arrow, increase volume; verbal "guide", display menu of available input sources… 306(6) |
| 108(5) | Connected via HDMI communication path with CEC supported to another media device 108 | Connect to media device 108(5) using WiFi; Up arrow, cursor up; down arrow, cursor down; verbal "guide", display main menu.. 306(7) |
| ⋮ |||

FIG. 3

MEDIA DEVICE CONTROL PROFILE SELECTION

BACKGROUND

A wide variety of media devices are available for users to consume an ever growing selection of content. These media devices may include televisions, tablet computers, personal computers, electronic book readers, gaming consoles, set-top boxes, media players, in-vehicle entertainment systems, portable media players, smartphones, and so forth. Each of these devices may have various functions which may be controlled.

BRIEF DESCRIPTION OF DRAWINGS

FIG. 2 is a block diagram of media device state data which may be received or otherwise acquired from one or more media devices.

FIG. 3 is a block diagram of media device control profiles associated with particular media devices and the media device state data.

Figure 1:
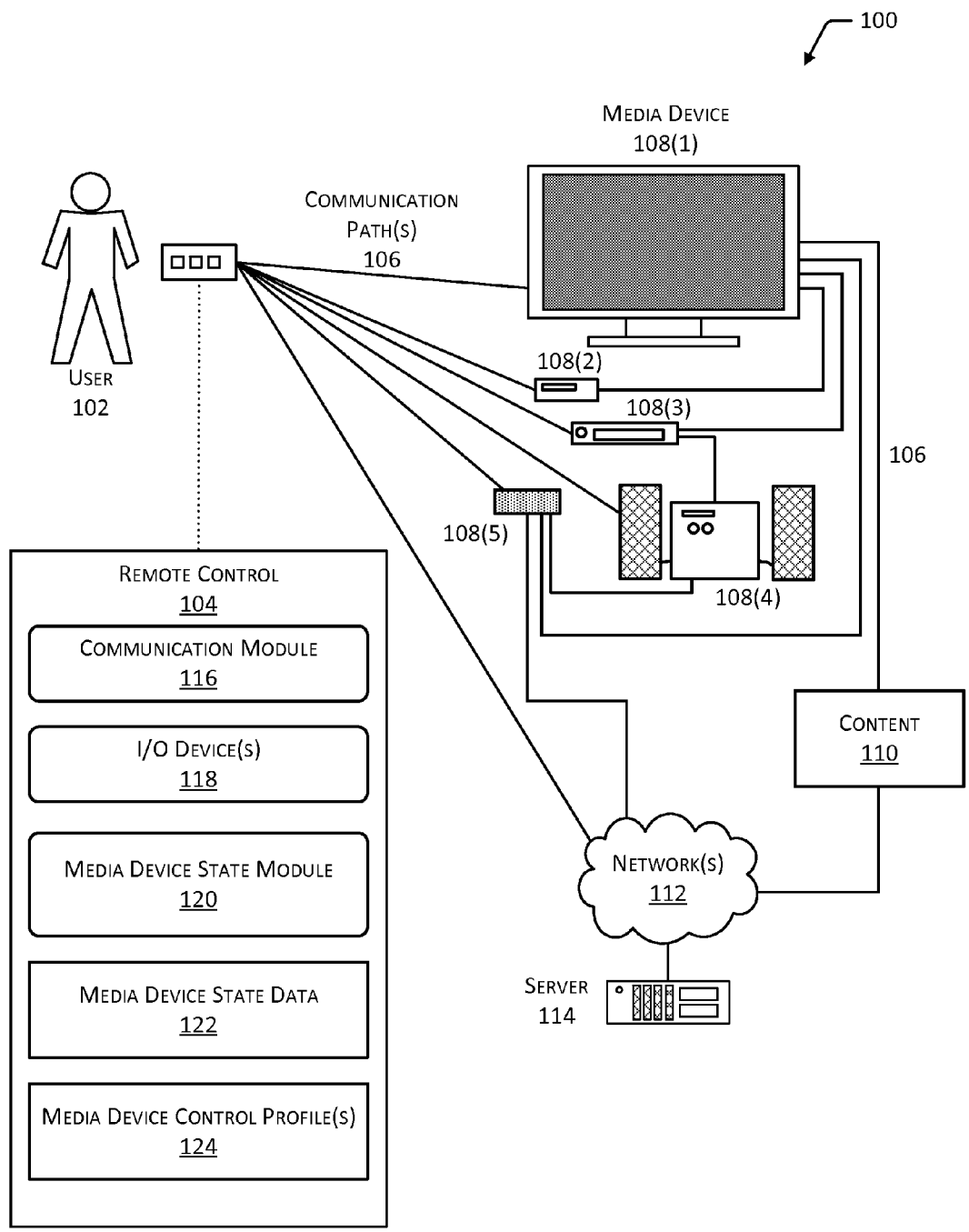
FIG. 1 is an illustrative system of selecting a media device control profile based at least in part on media device state data, to communicate with one or more media devices.

Certain implementations and embodiments will now be described more fully below with reference to the accompanying figures, in which various aspects are shown. However, various aspects may be implemented in many different forms and should not be construed as limited to the implementations set forth herein. Like numbers refer to like elements throughout.

DETAILED DESCRIPTION

The wide variety of media devices available to facilitate consumption of content by users result in a large number of input options. Traditionally, users have had to wield a different remote control for each of these media devices, manually select a particular device to control on a multifunction remote control, or enter commands from a large array of different buttons to control devices. This may result in a negative user experience, as users have to search for a particular remote, select the particular control functionality, pick through a myriad of buttons, and so forth to effect changes on the media devices.

Described in this application are devices and techniques which configure a remote control device, or other media devices, based at least in part on media device states. The media device state may include information indicative of the operating state of the media device such as operation in a reduced functionality mode or normal operating mode, whether particular components such as a Wi-Fi® communication interface are enabled, and so forth. This configuration may include determining a particular media device control profile which is associated with the media device states. The media device control profile may provide for various settings such as specifying an interval to send keepalive transmissions, mappings between user inputs received from the remote control with particular control data, and so forth. For example, when the media device state indicates that the television media device is set to present input from a set top box media device, the remote control may be configured to control the set top box media device. In another example, media state data indicating the media device is in a reduced functionality mode may be used to increase an interval at which keepalive transmissions are sent along a communication path. The keepalive transmissions serve to keep a particular communication path active for data transfer. By reducing the keepalive transmissions, power consumption of the remote control may be reduced, extending time between recharge or replacement of the battery in the remote control.

The media device control profile may also be configured to specify particular communication paths to use while sending data between the various devices. For example, the remote control may be configured with three communication paths available including a Wi-Fi® path, a Bluetooth® path, and an infrared signaling path. Continuing the example, the set top box media device may have a Bluetooth® interface which is disabled and a Wi-Fi® interface which is enabled. Based on the media device state of the set top box media device, the associated media device control profile may specify the use of the Wi-Fi® communication path, rather than attempting to establish a Bluetooth® connection with an interface which is disabled.

By providing a remote control which is responsive to the state of one or more of the media devices, the automated selection of the media device control profiles may be implemented. This may improve the user experience by having the remote control automatically configured to accept user input and provide corresponding control data to the media device which the user likely wants to control.

Illustrative System

FIG. 1 is an illustrative system 100 of selecting a media device control profile based at least in part on media device state data, to communicate with one or more media devices. A user 102 is depicted with a remote control 104. While a single user 102 is shown, in some implementations multiple users 102 may be present and may share the remote control 104. Similarly, in some implementations the system 100 may include more than one remote control 104.

The remote control 104 is configured to establish one or more communication paths 106 with one or more media devices 108(1), 108(2), . . . , 108(D). These communication paths 106 may utilize communication interfaces and corresponding hardware to exchange information using radio frequency signals, magnetic fields, light, electrical signals, and so forth. For example, the communication paths 106 may utilize radio frequency signals which are compliant with at least a portion of the 802.15.1 standard (Bluetooth®), the 802.11 standard (Wi-Fi®), and so forth as promulgated by the Institute of Electrical and Electronics Engineers ("IEEE"). The communication paths 106 may also include interfaces such as high definition multimedia interface ("HDMI"), Zig-Bee®, Ethernet, and so forth. The communication paths 106 are discussed in more detail below with regard to FIG. 4.

The communication paths 106 allow the media devices 108 and other devices to exchange information with one another. This information may include media device state, commands to control the media devices 108, content 110, and so forth. The content 110 may include audio, video, electronic books ("eBooks"), applications, games, and so forth.

The media devices 108 may include televisions, set top boxes, gaming consoles, cable television interfaces, audio/video receivers, tablet computers, smartphones, optical disk readers, and so forth. The optical disk readers may include devices compatible with compact disks ("CDs"), digital versatile disks ("DVDs"), Blu-ray disks, and so forth. The optical disk readers in some implementations may be configured to write data as well as read.

In this illustration, media device 108(1) is a display device such as a television, media device 108(2) is an optical disk player, media device 108(3) is a satellite broadcast receiver, media device 108(4) is an audio/video receiver ("AVR") sound system, and media device 108(5) is a set top box. The set top box media device 108(5) may provide various functions such as controlling the other media devices 108, presenting content, presenting a user interface to the user 102, and so forth. The media devices 108 are discussed in more detail below with regard to FIG. 7.

The remote control 104, the media devices 108, and other devices in the system 100 may be configured to connect to one or more networks 112. The one or more networks 112 may include one or more personal area networks, local area networks, public networks such as the Internet, private networks, cellular data networks, or a combination thereof. The network 112 may in turn couple to one or more servers 114. The server 114 may exchange information with the remote control 104, the one or more media devices 108, or other servers. In some implementations, the server 114 may be configured to provide at least a portion of the content 110 to the media devices 108. For example, the server 114 may be configured to stream the content 110 to the media device 108(5). The server 114 may also be configured to transfer information between the remote control 104 and the media devices 108. The server 114 is discussed in more detail below with regard to FIG. 8.

While the server 114 is depicted as a single server, in some implementations the server 114 or the functions attributed to the server 114 may be provided by a plurality of devices. For example, the server 114 may be implemented as a virtualized server executing across a plurality of physical servers. Likewise, other servers may be similarly configured.

The remote control 104 includes a communication module 116. The communication module 116 is configured to maintain one or more of the communication paths 106 with other devices. The communication module 116 may also be configured to facilitate the transfer of data along the communication paths 106. In some implementations, the communication module 116 may be configured to interface the remote control 104 with one or more of the media device interfaces. For example, where the media device interface comprises Wi-Fi®, the communication module 116 may establish a communication path 106 between the remote control 104 and the media devices 108 which support that path.

The remote control 104 may include one or more input/output ("I/O") devices 118. These I/O devices 118 may include input devices such as cameras, microphones, buttons, touch sensors, and so forth. The I/O devices 118 may also include output devices such as one or more of a display, audio speakers, haptic output device, projector, and so forth. The I/O devices 118 are discussed in more detail below with regard to FIG. 6.

A media device state module 120 is configured to determine media device state data 122 from one or more of the media devices 108. The determination may include interrogating the various media devices 108, listening for broadcasts of media device state data 122, receiving the data from the media devices 108 or the server 114, and so forth. The media device state data 122 is information which is indicative of one or more of a device description, an operational state of one or more input/output devices 118, a processor state, a link status of one or more communication paths with other devices, physical location, or physical proximity to other devices. For example, the media device state data 122 from the television media device 108(1) may indicate that the device is configured to accept input from the set top box media device 108(5), and is also in a low power mode with no image presented on a screen. The media device state data 122 is discussed in more detail below with regard to FIG. 2.

The media device state module 120 may also be configured to select a media device control profile 124, based at least in part on the media device state data 122. The media device control profile 124 includes information which may be used to configure operation of the remote control 104 with respect to the media devices 108. In one implementation, the media device control profile 124 may include a mapping of particular inputs to particular control data outputs. For example, one of the media device control profiles 124 associated with the television media device 108(1) while in the media device state of presenting broadcast television may map user input received from an up arrow button on the remote control with a command to increment a current channel. The control data is configured to initiate one or more actions by the one or more media devices 108.

The media device control profile 124 may include a designation of a particular communication path 106 to be used. For example, the media device control profile 124 associated with the television media device 108(1) media device state, as indicated in media device state data 122, may specify sending audio data from a microphone of the remote control 104 using the Wi-Fi® communication path 106. The media device control profiles 124 are discussed in more detail below with regard to FIG. 3. The remote control 104 is discussed in more detail below with regard to FIG. 6.

FIG. 2 illustrates a block diagram 200 of the media device state data 122 which may be received or otherwise acquired from one or more media devices 108. In this diagram, the media device state data 122 is depicted as a table. In other implementations, the media device state data 122 may be stored or expressed in various data structures including trees, linked lists, algorithms, code, and so forth.

The media device state data 122 may include a device identification 202 ("device ID") which indicates which of the media devices 108 the data is about. A device description 204 may provide information indicative of the operating system, hardware version, serial number, model number, extended display identification data ("EDID"), and so forth. A state description 206 includes information indicative of states of one or more components, systems, modules, and so forth, of the particular media device 108 indicated by the device ID 202. For example, as shown here the television media device 108(1) is on, has a Wi-Fi® communication interface enabled, and is configured to receive control data from the set top box media device 108(5). In comparison, the set top box media device 108(5) is on, has the Bluetooth® communication interface disabled, and has a Wi-Fi® communication interface enabled.

As described above, the media device state data 122 provides information which is indicative of one or more aspects of the media device 108. This information may include an operational state of one or more I/O devices 118, components, systems, modules, and so forth, of the media device 108. For example, the Bluetooth® communication interface is disabled. Processor state, such as whether in a reduced functionality or full functionality operating mode, and so forth may be provided. The processor state may be for a central processing unit, graphic processing unit, application specific integrated circuit, and so forth.

Link status of one or more of the communication paths 106 to other devices may also be indicated in the media device state data 122. For example, the link status may indicate that the media device 108(1) has an HDMI communication path 106 and a Wi-Fi® communication path 106 with the media device 108(5). Link status may also include, or be based at least in part on, other information such as data transfer speed, signal strength, protocol version supported, and so forth.

Other information, such as proximity 208 or location information, may be stored. This proximity 208 or location information may contain information about a physical proximity or distance between the media device 108 specified in the device ID 202 and the device which is using the information, such as the remote control 104. Location information, such which room the devices are in may also be maintained.

Last updated 210 information may indicate elapsed time since the media device state data 122 has been updated or refreshed. For example, as shown here, the information about the media device 108(5) was last updated 42 seconds earlier. In other implementations, this may be expressed as a count up with time increasing since the last update, as a date/time stamp, and so forth.

FIG. 3 illustrates a block diagram 300 of media device control profiles 124 associated with particular media devices 108 and the media device state data 122. In this diagram, the media device control profiles 124 are depicted as a table. In other implementations, the media device control profiles 124 may be stored or expressed in various data structures include trees, linked lists, and so forth.

The media device control profile 124 may include a device identification 302 ("device ID") which indicates which of the media devices 108 the media device control profile 124 is associated with. One or more associated states 304 may be specified for a control profile 306. A comparison between the media device state data 122 and the associated states 304 enables the media device state module 120 to determine a particular media device control profile 124 for use. For example, the control profile 306(1) is used when the associated states 304 indicate the media device 108(1) is in a low power mode.

The control profile 306 provides mappings, configuration data, or settings which may be applied to the remote control 104 or other devices. The mappings may include information which associates particular user inputs to particular control data outputs. The control data comprises information or instructions which, when processed by another device performs a particular action or function. For example, the control profile 306(1) maps the up arrow button of the remote control 104 to a control data which commands the media device 108(1) to change to a next channel.

The configuration data or other settings may be used to modify operation of the remote control 104 with respect to a particular media device 108, to all media devices 108, or locally to the remote control 104. For example, the configuration data may specify that a keepalive transmission used to maintain the communication path 106 to the media device 108(1) is to be set to transmit once every 3 minutes.

Several media device control profiles 124 may be associated with a single media device 108. For example, as shown here the media device 108(1) is associated with two control profiles 306(1) and 306(2). The media device state module 120 may select a particular control profile 306 based at least in part on the correspondence between the media device state data 122 and the associated states 304 for the control profiles 306.

Figure 4:
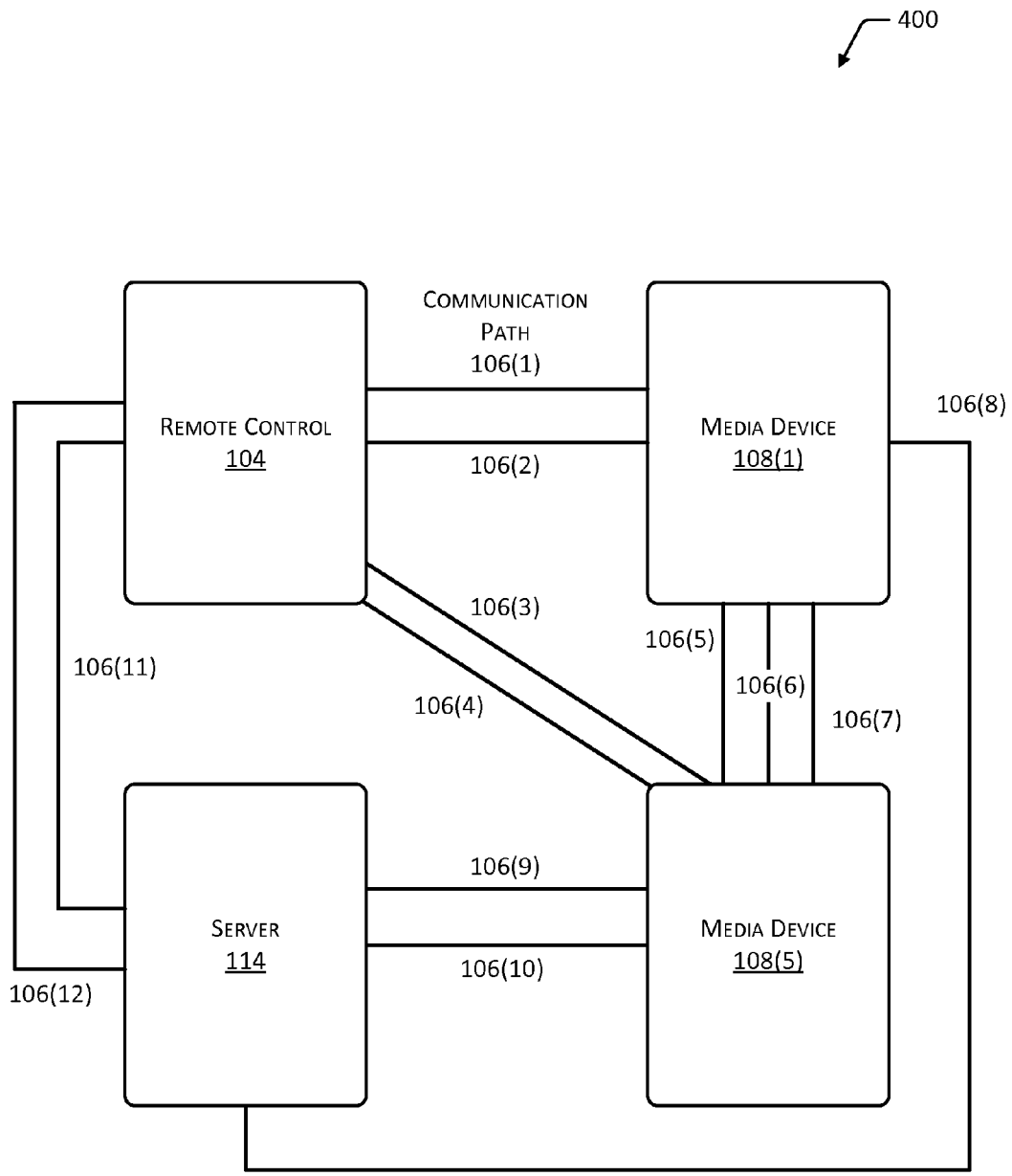
FIG. 4 is a block diagram of various communication paths between the devices in the system.

FIG. 4 is a block diagram 400 of various communication paths 106 between some of the devices in the system 100. For ease of illustration, and not by way of limitation, the remote control 104, the media devices 108(1) and 108(5), and the server 114 are depicted. The communication paths 106 may utilize communication interfaces, communication protocols, and corresponding hardware to exchange information using radio frequency signals, magnetic fields, light, electrical signals, and so forth. By using one or more communication paths 106, information such as content 110, control commands, and so forth may be exchanged between the remote control 104, the media devices 108, the server 114, and other devices. A particular communication path 106 may be specified to include one or more of a communication interface, frequency, or communication protocol. For example, one communication path 106 may use the Wi-Fi® communication protocol while another communication path 106 may use the ZigBee® communication protocol.

Different communication paths 106 may be better suited for particular functions or operational scenarios. For example, voice data produced by a microphone in the remote control 104 may have a preferred communication path 106 of Wi-Fi® over Bluetooth® to minimize latency. In another example, control commands from the remote control 104 to a media device 108 which has Wi-Fi® disabled may be forwarded or generated by the server 114 which is in contact with the media device 108.

As illustrated here, multiple communication paths 106 may be available between the various devices. The remote control 104 may have two communication paths 106(1) and 106(2) with the media device 108(1), such as Wi-Fi® and Bluetooth®. The remote control 104 may also have communication path 106(3) using Wi-Fi® and communication path 106(4) using infrared signaling with the media device 108(5). The media device 108(1) has three communications paths 106(5)-(7) with the media device 108(5). These may include ZigBee®, Wi-Fi®, and HDMI® over a cable. The media device 108(1) may also have a communication path 106(8) to the server 114. For example, the media device 108(1) may connect to the network 112 and is able to reach the server 114.

The media device 108(5) also maintains two communication paths 106(9) and 106(10) with the server 114, such as a wired local area network to a gateway and the Internet and a wireless wide area network such as 3G or 4G. Similarly, the server 114 may maintain two communication paths 106(11) and 106(12) with the remote control 104.

The media device control profiles 124 may specify particular communication paths 106 for use by particular devices when certain media device states are present. This specification of communication paths 106 may include a hierarchy of various priorities or preferences of use when multiple communication paths 106 are available. For example, voice input from the remote control 104 may be directed along the Wi-Fi® communication path 106(1) to the media device 108(5), while other command controls are sent along the Bluetooth® communication path 106(2). Continuing the example, should the media device state data 122 indicate the Wi-Fi® communication interface is disabled on the media device 108(5), the remote control 104 may direct the voice input to the server 114. The server 114 may process the audio, such as performing speech recognition, or may forward or relay the audio or information based thereon to the media device 108(5).

Figure 5:
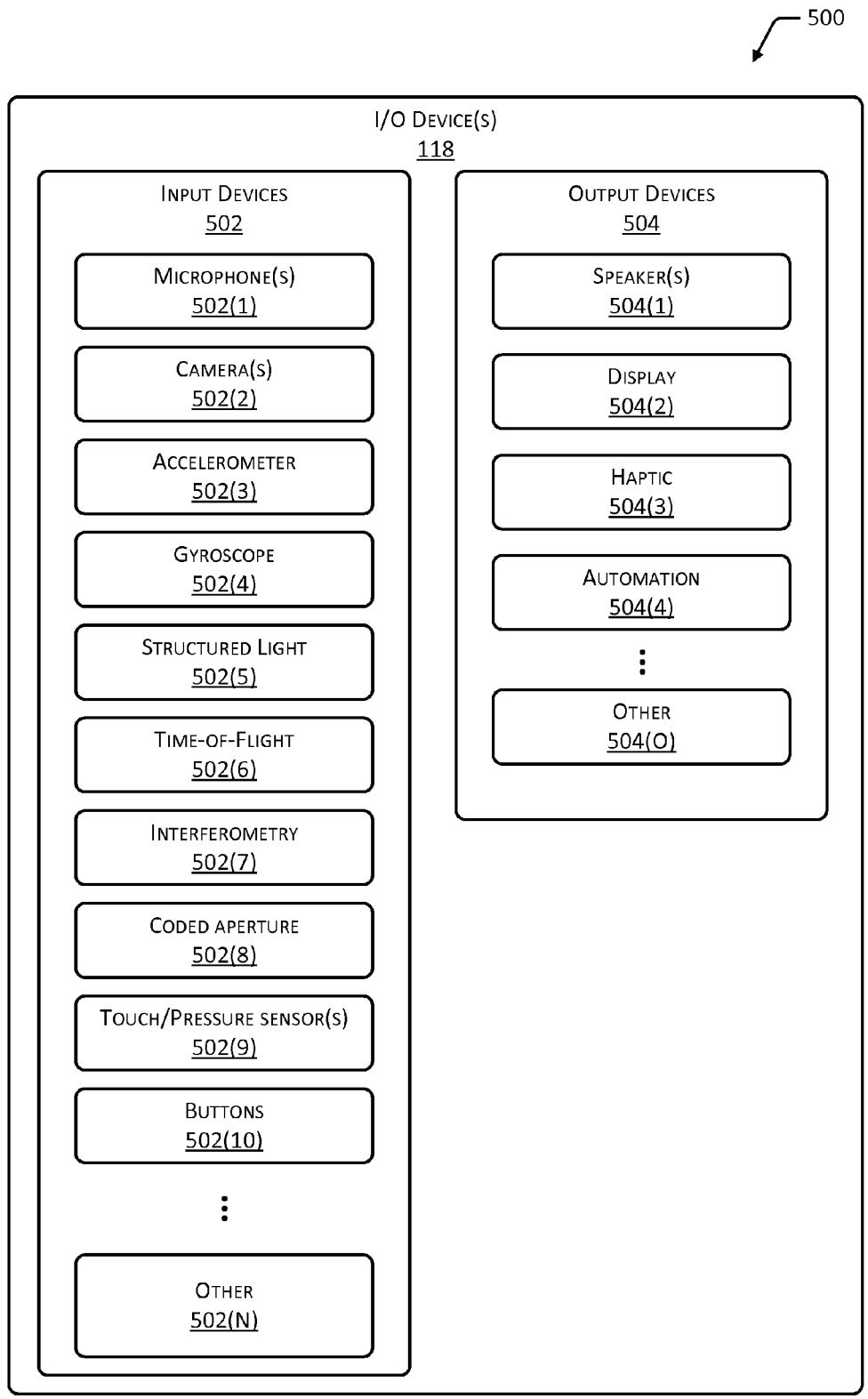
FIG. 5 is a block diagram of input/output devices that may be used on the various devices in the system.

FIG. 5 illustrates a block diagram 500 of input/output devices 118 that may be used in, or coupled to, the various devices in the system 100 such as the remote control 104, the media devices 108, the server 114, and so forth. As described above, the I/O devices 118 may be coupled to a device using one or more communication interfaces. These communication interfaces may include inter-integrated circuit ("I2C"), serial peripheral interface bus ("SPI"), Universal Serial Bus ("USB") as promulgated by the USB Implementers Forum, Wi-Fi®, Bluetooth®, HDMI®, and so forth.

The I/O devices 118 may be categorized by way of illustration and not as a limitation into input devices 502 and output devices 504. In general, input devices 502 are configured to acquire information, while output devices 504 present information to the user 102. Some devices may have only input devices 502, only output devices 504, or a combination of input devices 502 and output device 504.

The input devices 502 may include one or more microphones 502(1) configured to detect sounds which are audible, inaudible, or both. For example, the microphones 502(1) may include ultrasonic transducers configured to receive ultrasonic sound. A plurality of microphones 502(1) may be arranged in an array or other configuration to allow for various operations such as beamforming.

One or more cameras 502(2) may be provided to generate images using one or more of infrared light, visible light, ultraviolet light, and so forth. The cameras 502(2) may include charge coupled devices ("CCD"), complementary metal oxide semiconductor ("CMOS") devices, and so forth. In some implementations, the cameras 502(2) may be used in conjunction with other systems such as the structured light or time-of-flight systems described below. The one or more cameras 502(2) may be configured to provide mono- or stereovision.

The input devices 502 may include one or more accelerometers 502(3), gyroscopes 502(4), or both. The accelerometers 502(3) are configured to generate data indicative of one or more linear accelerations. The gyroscopes 502(4) are configured to generate data indicative of one or more rotations. The accelerometers 502(3), the gyroscopes 502(4), and others may include microelectromechanical ("MEMS") devices, fiber optic devices, and so forth.

Some of the input devices 502 may be configured to provide information such as distance, position in three-dimensional space, orientation, size, shape, and so forth. These devices may include a structured light 502(5) system, a time-of-flight 502(6) system, an interferometry systems 502(7), a coded aperture 502(8) system, and so forth.

The structured light system 502(5) uses a known pattern projected onto objects to determine information such as surface contour, distance, size, and so forth. In some implementations, this pattern may be generated by a projector. The pattern may be projected in visible light, infrared light, or other wavelengths. With structured light, the camera 502(2) acquires an image which includes at least a portion of the projected pattern. Based at least in part on variations in the pattern due to interactions with the objects, information such as distance, surface contours, size, and other three-dimensional information may be calculated. For example, the structured light system 502(5) may be used to determine that the user's 102 finger is pointing at the media devices 108(5).

The time-of-flight ("TOF") system 502(6) uses propagation time to determine a distance to an object in the environment. The TOF 502(6) system may use propagation of signals such as sound, infrared light, visible light, terahertz waves, radio waves, and so forth. For example, an infrared laser may be directed to scan a volume, emitting pulses of infrared light. During the scan, those pulses reflect at least in part from at least some of the objects in the volume. A detector, such as one of the cameras 502(2) or a photodetector, detects the reflected pulses. A timing mechanism is configured to determine a time-of-flight of the emitted signal. Based on the time-of-flight, a distance to the portion of the object from which the pulse was reflected can be determined. Time-of-flight in the optical domain may be known as LIDAR, in the radio frequency domain as RADAR, and in the audio domain as SONAR. The TOF system 502(6) may be configured to acquire depth information the image frames acquired by the one or more cameras 502(2).

The interferometry system 502(7) is configured to determine three-dimensional information about objects in space by illuminating one or more points on objects with coherent light. A phase shift, relative to the emitted light, of the reflected light is measured and used to determine a distance to the point on the object.

The coded aperture system 502(8) uses propagation characteristics of light from a scene through a specially coded aperture pattern or grating having holes of various sizes. Given the known coded aperture pattern, information about distance to a point in the image may be determined.

The input devices 502 may provide other information, such as touch or pressure sensors 502(9). These may include capacitive touch sensors, resistive touch sensors, optical touch sensors, acoustic touch sensors, load cells, strain gauges, and so forth. The touch/pressure sensors 502(9) may be configured to provide information about incident pressure, presence of the incident pressure, location, magnitude, and so forth.

Buttons 502(10) allow the user 102 to physically manipulate at least a portion of the device to generate an input signal. Buttons may include mechanical contact switches, optical switches, and so forth.

Other 502(N) input devices may also be present. These may include radio frequency identification ("RFID") readers, near field communication ("NFC") readers, magnetic compasses, and so forth.

The I/O devices 118 may also include the output devices 504. The output devices 504 may be configured to present information to the user 102, or provide some sort of physical action. The output devices 504 may include one or more speakers 504(1). The speakers 504(1) may be arranged in an array or predetermined configuration configured to provide a particular sound environment. For example, the speakers 504(1) may be arranged around the user 102 to the front and rear. The speakers 504(1) may be configured to provide audible or inaudible sound. For example, the speakers 504(1) may include ultrasonic transducers configured to emit ultrasonic signals.

One or more displays 504(2) may be provided. The displays 504(2) may include liquid crystal displays, interferometric displays, electrophoretic displays, electrowetting displays, cholesteric displays, light emitting diode displays, and so forth. In some implementations, the displays 504(2) may also utilize image projection systems having liquid crystal displays, digital micromirror devices, MEMs spatial light modulators, liquid crystal on silicon displays, light emitting diodes, lasers, and so forth.

One or more haptic devices 504(3) may be used to provide haptic output to the user 102. The haptic devices 504(3) may include linear actuators, motors, piezoelectric devices, modulated voltage sources, and so forth.

Automation devices 504(4) may be configured to provide other outputs or actions in the environment. Automation devices 504(4) may include lighting control, environmental control, physical access control such as remotely controlled doors, appliances, robotics, and so forth.

Other output devices 504(0) may also be available. For example, olfactory output devices may be configured to release particular aromas to stimulate the user's 102 sense of smell. In another example, printers may be configured to provide hardcopy of images or items.

Figure 6:
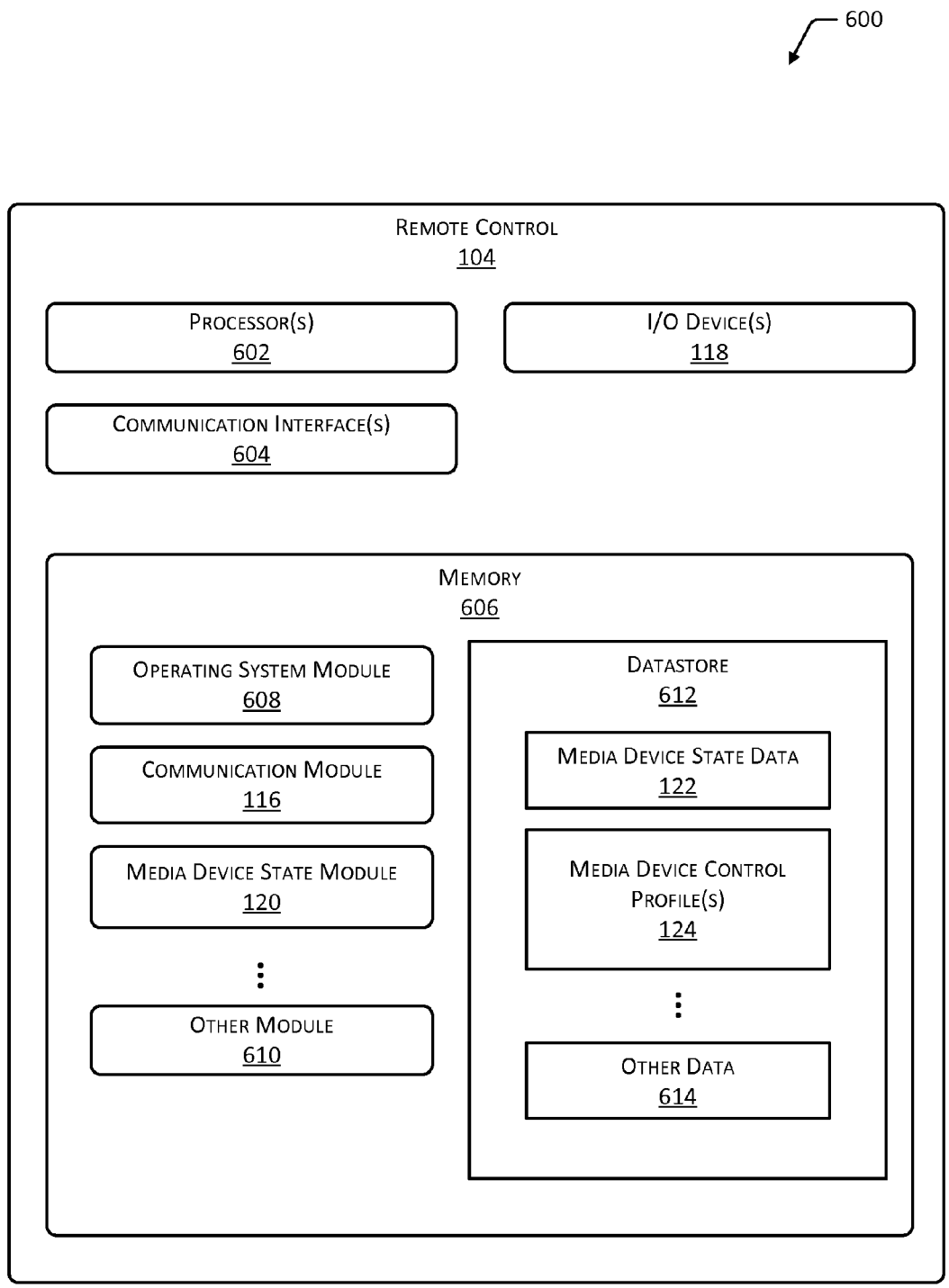
FIG. 6 is a block diagram of a remote control configured to use different media device control profiles based at least in part on the media device state.

FIG. 6 illustrates a block diagram 600 of the remote control 104 configured to use different media device control profiles 124 based at least in part on the media device state data 122. In some implementations, the remote control 104 may be provided in a form factor such as a handheld device, tablet, slate, and so forth. The remote control 104 may also be configured to present output to the user 102, as described below.

The remote control 104 may include one or more processors 602 configured to execute one or more stored instructions. The processors 602 may comprise one or more cores. The remote control 104 may include one or more communication interfaces 604 to allow the processor 602 or other portions of the remote control 104 to communicate with other devices. The communication interfaces 604 may comprise inter-integrated circuit ("I2C"), serial peripheral interface bus ("SPI"), Universal Serial Bus ("USB") as promulgated by the USB Implementers Forum, RS-232, High Definition Multimedia Interface ("HDMI") as promulgated by HDMI® Licensing LLC, TOSLINK® as promulgated by Toshiba Corp., analog video, analog audio, IEEE 1394 as promulgated by the Institute for Electrical and Electronics Engineers, Ethernet interface, Wi-Fi® interface, Bluetooth® interface, ZigBee® interface, and so forth. The communication interfaces 604 may be configured to couple to the network 112, the media device 108, other devices such as access points, and so forth.

The communication interfaces 604 may couple to one or more I/O devices 118. The I/O devices 118 may include microphones 502(1), touch sensors 502(9), buttons 502(10), haptic output devices 504(3), and so forth as described above with regard to FIG. 5. The I/O devices 118 may be physically incorporated with the remote control 104 or may be externally placed. The remote control 104 may also include one or more busses or other internal communications hardware or software that allow for the transfer of data between the various modules and components of the remote control 104.

As shown in FIG. 6, the remote control 104 includes one or more memories 606. The memory 606 comprises one or more computer-readable storage media ("CRSM"). The CRSM may be any one or more of an electronic storage medium, a magnetic storage medium, an optical storage medium, a quantum storage medium, a mechanical computer storage medium and so forth. The memory 606 provides storage of computer readable instructions, data structures, program modules and other data for the operation of the remote control 104.

The memory 606 may include at least one operating system ("OS") module 608. The OS module 608 is configured to manage hardware resource devices such as the communication interfaces 604, the I/O devices 118, and provide various services to applications or modules executing on the processors 602. Also stored in the memory 606 may be one or more of the following modules. These modules may be executed as foreground applications, background tasks, daemons, and so forth.

The communication module 116, as described above is configured to maintain one or more of the communication paths 106 with other devices. The communication module 116 may be configured to send, receive, or send and receive keepalive transmissions or packets. The keepalive transmissions serve to keep a particular communication path 106 active for data transfer. For example, a keepalive packet may be sent along the Wi-Fi® communication path periodically to maintain an association between the remote control 104 and the media device 108. By maintaining this communication path 106, future communication along the communication path 106 may occur more quickly. In comparison, when the keepalive transmissions are not in use, the communication path 106 may be dropped. As a result, future communication would experience a delay while the communication path 106 is re-established.

As described above, the media device state module 120 is configured to determine media device state data 122 from one or more of the media devices 108. The media device state module 120 may acquire the media device state data 122 actively, passively, or using a combination of both.

Active acquisition may include the remote control 104 interrogating the various media devices 108. The interrogation involves actively soliciting one or more of the media devices 108 for information by sending a request for data to the one or more media devices 108. This interrogation may be sent individually to particular media devices 108, or may be multicast or broadcast to any listening media devices 108. Responsive to this solicitation, the media devices 108 may respond with the media device state data 122. For example, the remote control 104 may send using the communication pathways 106 an interrogation packet configured to elicit a response from a corresponding module, such as a media device state module 120, executing on the media devices 104. In one implementation, the remote control 104 may interrogate the server 114, which may have acquired the media device state data 122 from the media devices 108. Responsive to the interrogation, the server 114 may send the media device state data 122 for one or more of the media devices 108 to the remote control 104.

Passive acquisition may include the remote control 104 or another device monitoring information being sent from the media devices 108. In one implementation, passive acquisition may include processing of broadcasts of state information. For example, a Consumer Electronics Control ("CEC") bus may be monitored and state changes such as the television media device 108(1) coming online may be used to generate the media device state data 122.

Combinations of active and passive acquisition may be used. For example, active acquisition may be used initially, and passive acquisition may be used to maintain at least a portion of the media device state data 122 as current, until active acquisition is initiated, such as after a predetermined time limit.

The media device state module 120 may also be configured to select a media device control profile 124, based at least in part on the media device state data 122. The selection may including matching at least a portion of the media device state data 122 with the associated states 304 in the media device control profiles 124. For example, the media device state data 122 indicating that the media device 108(3) is on and 108(5) is off matches with the associated states 304 of the control profile 306(5). The matching media device control profile 124 may then be implemented by the media device state module 120. Continuing the example, the remote control 104 may be configured to use the infrared communication path 106 during communication with the media device 108(3), send control data for a next song based on an up arrow user input on the remote control 104, and so forth.

Other modules 610 may also be present. For example, a presentation module may be provided to allow the remote control 104 to act as a source and send content 110 to one or more of the media devices 108 for presentation. In another example, a digital rights management module may be present and configured to support presentation of content 110 protected by one or more digital rights management schemes.

The memory 606 may also include a datastore 612 to store information. The datastore 612 may use a flat file, database, linked list, tree, or other data structure to store the information. In some implementations, the datastore 612 or a portion of the datastore 612 may be distributed across one or more other devices including servers 114, network attached storage devices, and so forth.

The datastore 612 may also store the media device state data 122, the media device control profiles 124, or other data 614. For example, the other data 614 may include user preferences, communication path parameters, and so forth. In some implementations, the datastore 612 may store a portion of the content 110, or the entire piece of content 110.

Figure 7:
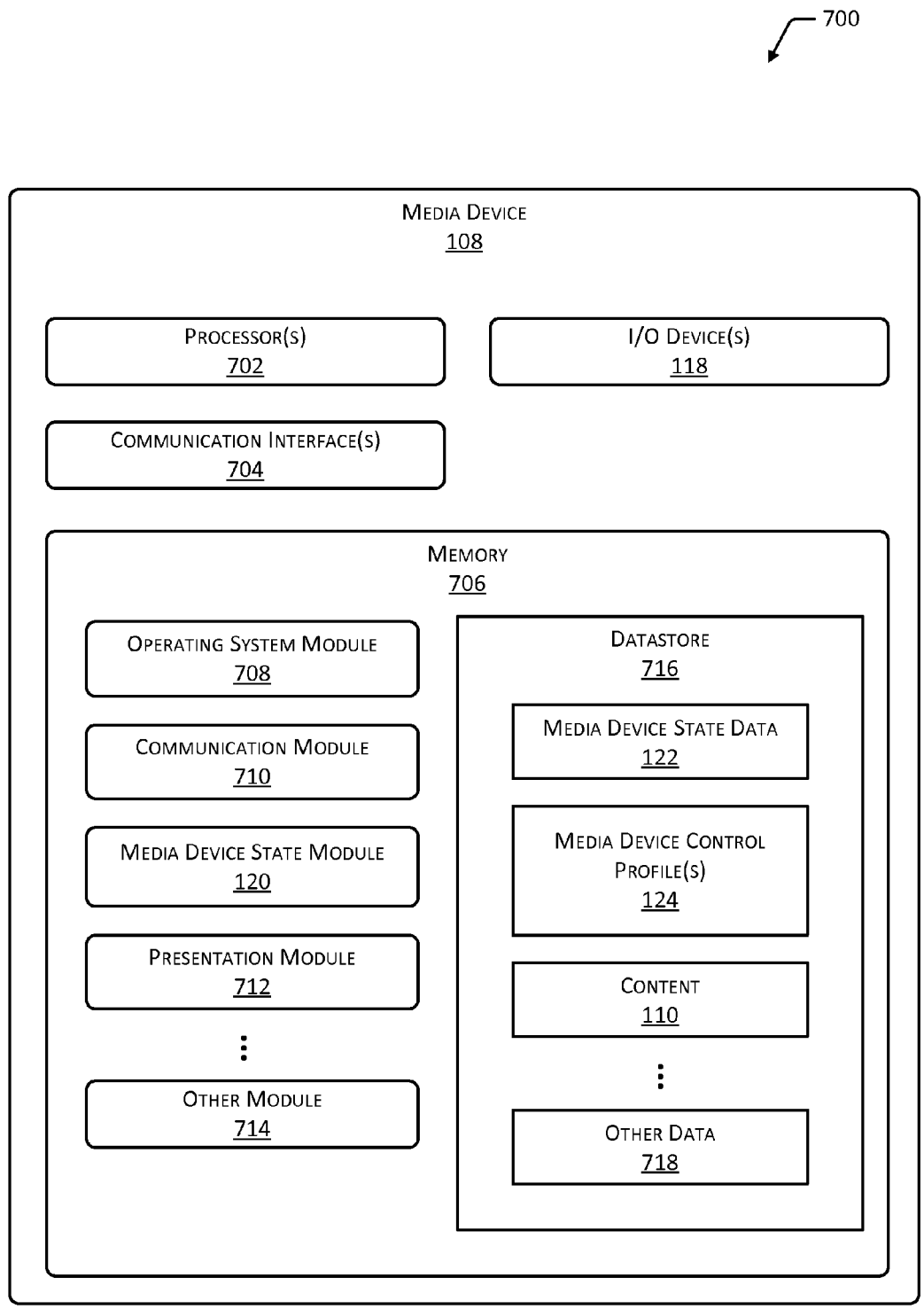
FIG. 7 is a block diagram of a media device configured to provide media device state data.

FIG. 7 is a block diagram 700 of the media device 108. As described above, the media device 108 is configured to present, manipulate, or otherwise process content 110 to or for the user 102. The media device 108 may include one or more processors 702 configured to execute one or more stored instructions. The processors 702 may comprise one or more cores. The media device 108 may include one or more communication interfaces 704 to allow the processor 702 or other portions of the media device 108 to communicate with other devices. The communication interfaces 704 may be similar to those described above with respect to the communication interfaces 604 described above in FIG. 6. The communication interfaces 704 may be configured to couple to the network 112, the remote controls 104, devices such as access points, and so forth.

The communication interfaces 704 may couple to one or more I/O devices 118. The I/O devices 118 may include microphones 502(1), structured light systems 502(5), time-of-flight systems 502(6), and so forth as described above with regard to FIG. 5. The I/O devices 118 may be physically incorporated with the media device 108 or may be externally placed. The media device 108 may also include one or more busses or other internal communications hardware or software that allow for the transfer of data between the various modules and components of the media device 108.

As shown in FIG. 7, the media device 108 includes one or more memories 706. The memory 706 comprises one or more CRSM. The memory 706 provides storage of computer readable instructions, data structures, program modules and other data for the operation of the media device 108.

The memory 706 may include at least one operating system ("OS") module 708. The OS module 708 is configured to manage hardware resource devices such as the communication interfaces 704, the I/O devices 118, and provide various services to applications or modules executing on the processors 702. Also stored in the memory 706 may be one or more of the following modules. These modules may be executed as foreground applications, background tasks, daemons, and so forth.

A communication module 710 is configured to maintain one or more of the communication paths 106 with other devices. The communication module 710 may be similar in function to the communication module 116 described above.

As described above, the media device state module 120 is configured to determine media device state data 122 from one or more of the other media devices 108, the remote control 104, or other devices. In some implementations, the media device state module 120 may be configured to respond to interrogations for the media device state data 122, such as from the remote control 104, and provide the data in response. In other implementations, the media device state module 120 may send the media device state data 122 without receiving an interrogation.

The media device 108 may sometimes be configured to interact with another media device 108. For example, the set top box media device 108(5) may send video data to the television media device 108(1) using the HDMI communication path 106. As described above, the media device state module 120 may be configured to select a media device control profile 124, based at least in part on the media device state data 122. This media device control profile 124 may be used to designate the particular communication path 106, configure particular command data, and so forth.

A presentation module 712 may be provided to allow the media device 108 to present the content 110 or other information such as a user interface. In some implementations, the media device 108 is configured to act as a source and send content 110 or information based at least in part on the content 110, to one or more of the media devices 108 for presentation. For example, the set top box media device 108(5) may use the television media device 108(1) to present at least a portion of a graphic user interface used to control the set top box media device 108(5).

Other modules 714 may also be present. For example, a speech recognition module may be configured to process audio input. In another implementation, a digital rights management ("DRM") module may be configured to decrypt or otherwise provide access to content 110 which is protected using one or more DRM schemes.

The memory 706 may also include a datastore 716 to store information. The datastore 716 may use a flat file, database, linked list, tree, or other data structure to store the information. In some implementations, the datastore 716 or a portion of the datastore 716 may be distributed across one or more other devices including servers 114, network attached storage devices, and so forth.

The datastore 716 may also store the media device state data 122, the media device control profiles 124, content 110, or other data 718. For example, the other data 718 may include user preferences, communication path parameters, and so forth. The content 110 may be stored in whole or in part.

Figure 8:
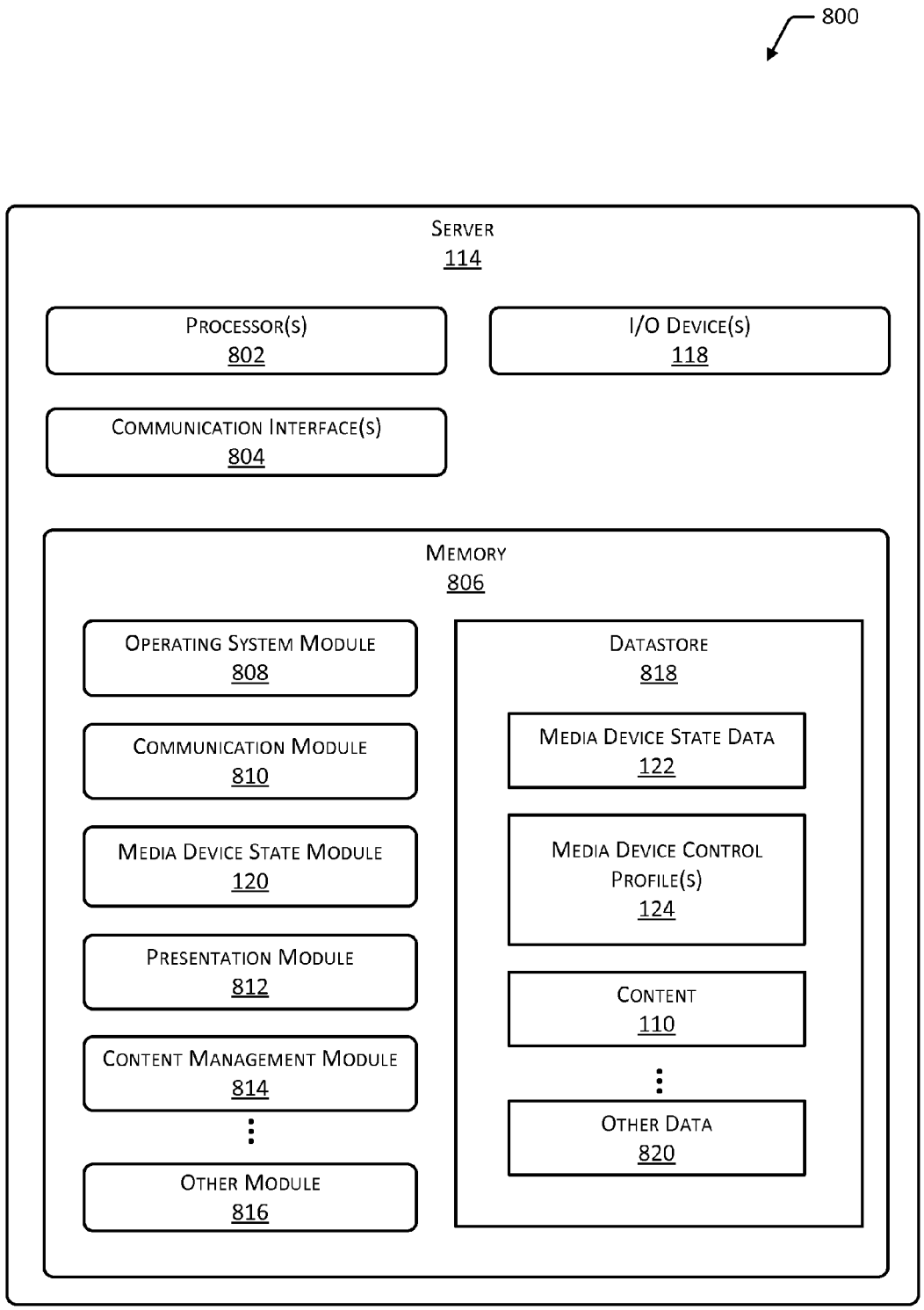
FIG. 8 is a block diagram of a server configured to provide media device state data.

FIG. 8 is a block diagram 800 of the server 114. The server 114 may be configured to receive and send media device state data 122 between remote control 104, the media devices 108, or other devices in the environment 100. The server 114 may also provide other functions, as described below.

The server 114 may include one or more processors 802 configured to execute one or more stored instructions. The processors 802 may comprise one or more cores. The server 114 may include one or more communication interfaces 804 to allow the processor 802 or other portions of the server 114 to communicate with other devices. The communication interfaces 804 may be similar to those described above with respect to the communication interfaces 604 described above in FIG. 6. The communication interfaces 804 may be configured to couple to the network 112, the remote controls 104, the media devices 108, devices such as access points, and so forth.

The communication interfaces 804 may couple to one or more I/O devices 118. The I/O devices 118 may include microphones 502(1), structured light systems 502(5), timeof-flight systems 502(6), and so forth as described above with regard to FIG. 5. The I/O devices 118 may be physically incorporated with the server 114 or may be externally placed. The server 114 may also include one or more busses or other internal communications hardware or software that allow for the transfer of data between the various modules and components of the server 114.

As shown in FIG. 8, the server 114 includes one or more memories 806. The memory 806 comprises one or more CRSM. The memory 806 provides storage of computer readable instructions, data structures, program modules and other data for the operation of the server 114.

The memory 806 may include at least one operating system ("OS") module 808. The OS module 808 is configured to manage hardware resource devices such as the communication interfaces 804, the I/O devices 118, and provide various services to applications or modules executing on the processors 802. Also stored in the memory 806 may be one or more of the following modules. These modules may be executed as foreground applications, background tasks, daemons, and so forth.

A communication module 810 is configured to maintain one or more of the communication paths 106 with other devices. The communication module 810 may be similar in function to the communication module 116 described above.

As described above, the media device state module 120 may be configured to determine media device state data 122 from one or more of the other media devices 108, the remote control 104, or other devices. The media device module 120 may be configured to receive or request the media device state data 122 from the devices in the system 100. The media device state data 122 may then be distributed by the media device state module 120 to the one or more devices such as the media devices 108, the remote control 104, and so forth.

The media device state module 120 may also be configured to send or receive media device control profiles 124. For example, the server 114 may be configured to distribute previously generated media device control profiles 124, such as those generated by a developer, an administrator, a machine learning system, an automated system, and so forth.

A presentation module 812 may be provided to allow the server 114 to present the content 110 or other information to the one or more media devices 108 or other devices. For example, the presentation module 812 may be configured to stream content 110 from the server 114 to the media device 108, the remote control 104, or another device.

In some implementations, the presentation module 812 may provide particular output based at least in part on the media device state data 122. For example, the media device state data 122 may indicate that the display 504(2) of the television media device 108(1) is set to present a black screen, while the speakers 504(1) are providing sound. Based on this state, the presentation module 812 may send audio of the content 110 only, avoiding the transmission of more bandwidth-intensive video which would not be presented to the user 102.

A content management module 814 is configured to manage access to content 110, digital rights management, and so forth. For example, the content management module 814 may be configured to authenticate the user 102 and allow access to content 110 associated with the user 102.

Other modules 816 may also be present. For example, a speech recognition module may be configured to process audio input, such as received from the microphone 502(1) in the remote control 104.

The memory 806 may also include a datastore 818 to store information. The datastore 818 may use a flat file, database, linked list, tree, or other data structure to store the information. In some implementations, the datastore 818 or a portion of the datastore 818 may be distributed across one or more other devices including servers 114, network attached storage devices, and so forth.

The datastore 818 may also store the media device state data 122, the media device control profiles 124, content 110, or other data 820. For example, the other data 820 may include user preferences, communication path parameters, and so forth. The content 110 may be stored in whole or in part.

Illustrative Processes

Figure 9:
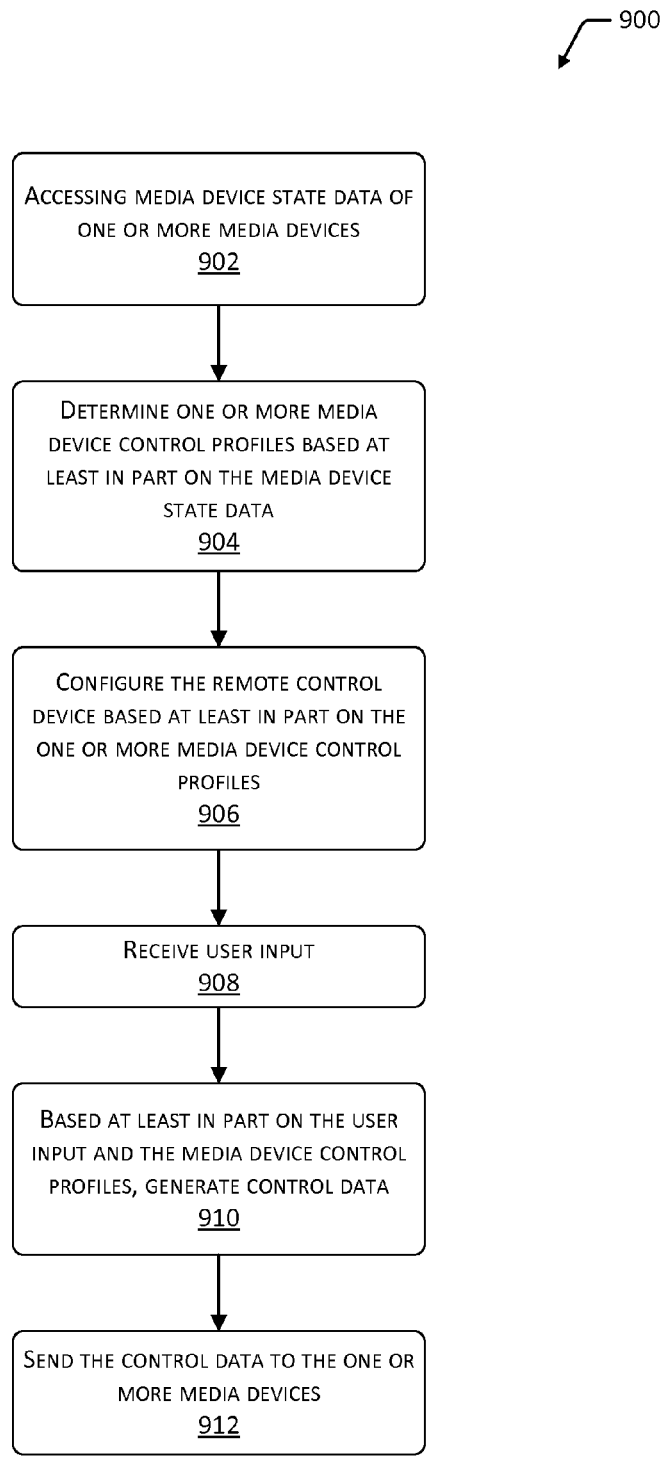
FIG. 9 is a flow diagram of a process of configuring a remote control based at least in part on the media device state.

FIG. 9 is a flow diagram 900 of a process of configuring the remote control 104 based at least in part on the media device state data 122. This process may be implemented by the remote control 104, the media device 108, the server 114, or a combination thereof. In one implementation, the server 114 may implement this process and instruct the remote control 104 to use a particular media device control profile 124.

Block 902 accesses or determines the media device state data 122 of one or more media devices 108. As described above, the media device state data 122 may be stored in one or more memories 606, 706, 806, and so forth. For example, the media device state module 120 of the remote control 104 may have received a broadcast over a Wi-Fi® communication path 106 that the television media device 108(1) has entered a reduced functionality mode, such as a low power mode, and stored this information in memory 606.

The determination of the media device state data 122, as described above, may also be received from another device, such as the server 114 which redistributes the media device state data 122 for one or more of the media devices 108 or other devices in the system 100.

The media device state data 122 may be generated by interrogating the one or more media devices 108 for their state information. The media device state data 122 may then be generated based at least in part on responses or non-responses.

Block 904 determines one or more media device control profiles 124 based at least in part on the media device state data 122. In one implementation as described above, the media device module 120 may compare at least a portion of the media device state data 122 with the associated states 304 of the available control profiles 306 to determine the one or more media device control profiles 124 for use. For example, based on the media device state data 122 indicating the set top box media device 108(5) is providing content 110 and controlling other media devices 108, the media device control profile 124 may be selected which corresponds to control of the set top box media device 108(5).

Block 906 configures the remote control 104 based at least in part on the one or more media device control profiles 124. This configuration may include configuring the processor to generate control data. The control data are commands, sequences, instructions, and so forth. The control data is configured to initiate one or more actions when processed by the one or more media devices 108. In some implementations, the control data may comprise one or more sequences which are compliant with at least a portion of the Consumer Electronics Control ("CEC") standard.

Different media devices 108 may have different control data to perform various functions. For example, the control data to change a channel on the television media device 108(1) may be different from the control data to change a channel on the satellite broadcast receiver media device 108(3).

Block 908 receives user input. The user input may include one or more motions, one or more gestures, one or more uttered sounds, or one or more activations of buttons. For example, the user 102 may press an "up arrow" button 502(10) on the remote control 104. The user input may also be the absence of at least one of the one or more motions, the one or more gestures, the one or more uttered sounds, the one or more button activations, and so forth. For example, a default action may be presented with a user interface and the default action may be accepted when the user refrains from providing any input.

The media device control profiles 124 may include a mapping of particular user inputs to particular control data outputs. For example, the user input of pressing an up arrow button on the remote control 104 may result in a particular control data output which corresponds to the "next channel" function. Block 910, based at least in part on the user input and the media device control profiles, generates the control data.

Block 912 sends the control data to the one or more media devices 108. As described above, in some implementations the media device control profiles 124 may designate particular communication paths 106 and circumstances within which those paths are to be used. The configuration of the remote control 104 may further include configuring the communication interface 604 to establish one or more communication paths 106 with the one or more media devices 108. For example, establishing and maintaining with a keepalive packet, a Wi-Fi® connection. In some implementations, the control data may be sent using the one or more communication paths 106 designated by the media device control profiles 124.

Figure 10:
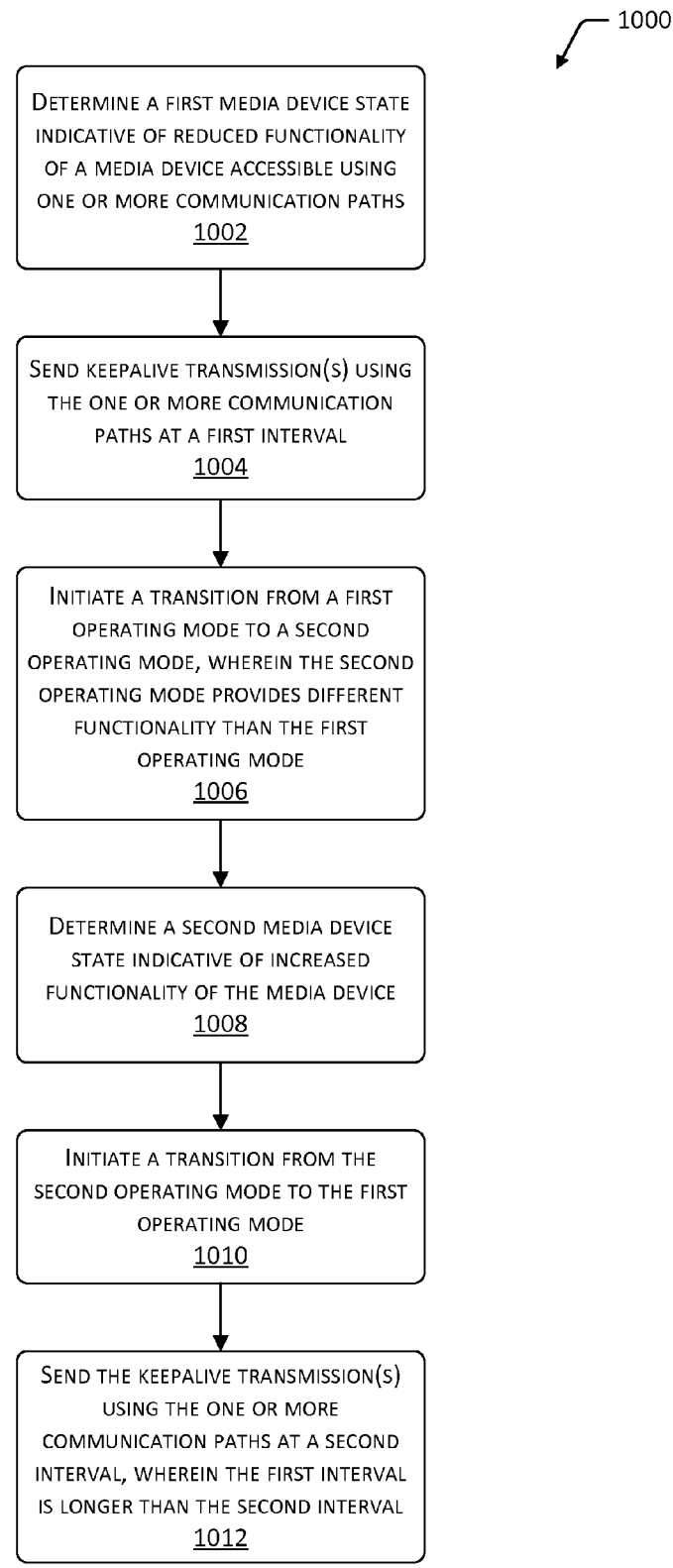
FIG. 10 is a flow diagram of a process of configuring a remote control keepalive transmission interval based at least in part on the media device state.

FIG. 10 is a flow diagram of a process 1000 of configuring the remote control 104 keepalive transmission interval based at least in part on the media device state data 122. This process may be implemented by the remote control 104, the media device 108, the server 114, or a combination thereof.

As described above, the remote control 104 may be configured to maintain one or more communication paths 106 with one or more of the media devices 108. Some of communication interfaces 604, 704, or 804, may use a keepalive signal to maintain a communication path 106. For example, a keepalive packet may be periodically sent to maintain association with a Wi-Fi® access point, maintain pairing between Bluetooth® devices, and so forth.

Block 1002 determines a first media device state which is indicative of the media device 108 in a first state of functionality. This first state of functionality may be reduced compared to a second state of functionality. In one implementation, the first state of functionality is reduced when one or more components of the media device 108 are in a low power mode, operating at reduced speed, disabled, and so forth. Similarly, a second state of functionality comprises a normal operating mode for the one or more components of the media device 108. For example, the media device state data 122 may indicate that the processor of the media device 108(1) has entered a low power mode to conserve power.

Based at least in part on the first media device state, block 1004 periodically sends one or more keepalive transmissions using one or more communication paths 106. These keepalive transmissions may be sent at a first interval, with each of the keepalive transmissions separated from one another by the first time interval. The communication paths 106 are maintained, at least in part, by one or more communication interfaces 604. The keepalive signal or packet may be configured to include or otherwise convey at least a portion of the media device state data 122 for one or more of the devices in the system 100. In some implementations, the communication interfaces 604 may be configured to establish a connection compliant with at least a portion of the IEEE 802.15.1 standard also known as Bluetooth®, the IEEE 802.11 standard also known as Wi-Fi®, or both. For example, a keepalive packet may be periodically sent from the remote control 104 using the Wi-Fi® communication interface 604 to the media device 108 to maintain the connection. The first interval may be relatively long, and may be configured to occur just prior to a maximum timeout interval of one or more of the devices involved in maintaining the communication path 106. The first interval may be predetermined, or determined based on automated testing of the communication path 106.

In some implementations, block 1006 may initiate a transition from a first operating mode to a second operating mode. The second operating mode may provide a different functionality than the first operating mode. For example, given that the media device state data 122 indicates the media device 108(1) is in a low power mode, the remote control 104 may transition to a low power mode to reduce power consumption relative to the normal operating mode, which conserves battery power. In another example, the second operating mode may operate one or more of the processors 602 at a lower clock rate than the first operating mode.

Block 1008 determines a second media device state which is indicative of the media device 108 in the second state of functionality. For example, a packet may be sent from the media device 108(1) to the remote control 104 indicating the media device 108(1) has resumed normal operating mode.

In some implementations where block 1006 has placed the remote control 104 into the second operating mode, block 1010 may initiate a transition from the second operating mode to the first operating mode. For example, the remote control 104 may change from being in the low power mode to the normal operating mode.

Based at least in part on the second media device state, block 1012 sends the keepalive transmissions using the one or more communication paths 106 at a second interval. The first interval is longer than the second interval. For example, the first interval may be 180 seconds while the second interval is 20 seconds. Continuing the example, now that the television media device 108(1) has resumed normal operating mode, frequency of the keepalive transmissions may be increased to one every 20 seconds. By adjusting the keepalive intervals, based at least in part on the media device state data 122, the remote control 104 may conserve battery power, extending the operating time between recharging or battery replacement.

Those having ordinary skill in the art will readily recognize that certain steps or operations illustrated in the figures above can be eliminated or taken in an alternate order. Moreover, the methods described above may be implemented as one or more software programs for a computer system and are encoded in a computer readable storage medium as instructions executable on one or more processors.

The computer readable storage medium can be any one of an electronic storage medium, a magnetic storage medium, an optical storage medium, a quantum storage medium and so forth. Separate instances of these programs can be executed on or distributed across separate computer systems. Thus, although certain steps have been described as being performed by certain devices, software programs, processes, or entities, this need not be the case and a variety of alternative implementations will be understood by those having ordinary skill in the art.

Additionally, those having ordinary skill in the art readily recognize that the techniques described above can be utilized in a variety of devices, environments and situations.

Although the present disclosure is written with respect to specific embodiments and implementations, various changes and modifications may be suggested to one skilled in the art and it is intended that the present disclosure encompass such changes and modifications that fall within the scope of the appended claims.

What is claimed is:

1. A remote control system, comprising:
   at least one communication interface, configured to provide one or more communication paths with a first media device, wherein the first media device is controlled by the remote control system and a second media device is in communication with the first media device;
   at least one memory storing computer-executable instructions; and
   at least one processor configured to access the at least one communication interface and the at least one memory, the at least one processor configured to execute the computer-executable instructions to cause the at least one processor to:
      determine a first media device state of the first media device, wherein the first media device state is indicative of a physical proximity of the first media device to the second media device and operating one or more components of the first media device in a low power mode compared to a normal operating mode;
      determine a media device control profile comprising information to establish the one or more communication paths to the first media device;
      based at least in part on the first media device state and the media device control profile:
         periodically send a plurality of keepalive transmissions to the first media device using the one or more communication paths, wherein each transmission is separated by a first time interval; and
         configure one or more of the at least one communication interface, the at least one memory, or the at least one processor into the low power mode configured to reduce power consumption relative to a normal operating mode;
      determine a second media device state of the first media device, wherein the second media device state is indicative of the first media device operating one or more components of the first media device in the normal operating mode which provides increased functionality relative to the first media device state, further wherein the increased functionality comprises one or more components actively processing data; and
      based at least in part on the second media device state and the media device control profile:
         configure one or more of the at least one communication interface, the at least one memory, or the at least one processor to the normal power mode; and
         periodically send the plurality of keepalive transmissions to the first media device using the one or more communication paths, wherein each transmission is separated by a second time interval, and further wherein the first time interval is longer than the second time interval.

2. The system of claim 1, wherein the media device comprises a television, a set top box, a gaming console, a cable television interface, an audio/video receiver, a tablet computer, a smartphone, or an optical disk reader; and
   wherein the at least one communication interface is configured to establish a connection compliant with at least a portion of an 802.15.1 standard, an 802.11 standard, or both, as promulgated by the Institute of Electrical and Electronics Engineers ("IEEE").

3. The system of claim 1, further comprising one or more input devices coupled to the at least one processor; and
   further comprising instructions configured to cause the at least one processor to:
      based at least in part on the second media device state and the media device control profile;
      receive one or more inputs from the one or more input devices;
      generate control data based at least in part on the one or more inputs and the media device control profile, wherein the control data is configured to initiate one or more actions by the first media device; and
      send the control data to the first media device using the one or more communication paths.

4. The system of claim 3, wherein the media device control profile further comprises information mapping a particular input from one or more of the input devices to a particular control data output.

5. A computer-implemented method of remotely controlling one or more media devices comprising:
   determining media device state data describing a state of the one or more media devices indicative of a physical proximity of a first media device to a second media device, wherein the first media device is in communication with the second media device;
   determining a media device control profile associated with the media device state data;
   receiving one or more inputs from one or more input devices;
   generating control data based at least in part on the one or more inputs and the media device control profile, wherein the control data is configured to initiate one or more actions by the first media device; and
   sending the control data to the first media device.

6. The method of claim 5, wherein the media device state data further comprises information indicative of one or more of:
   a device description of the one or more media devices,
   an operational state of one or more input/output devices of the one or more media devices,
   a processor state of the one or more media devices,
   a link status of one or more communication paths to the one or more media devices, or
   a physical location of the one or more media devices.

7. The method of claim 5, wherein the one or more media devices comprise a television, a set top box, a gaming console, a cable television interface, an audio/video receiver, a tablet computer, a smartphone, or an optical disk reader.

8. The method of claim 5, wherein the determining the one or more media device state data further comprises interrogating each of the one or more media devices for the respective media device state data by sending to the one or more media devices a request for the media device state data.

9. The method of claim 5, further comprising receiving the media device state data from a server which is in communication with at least one of the one or more media devices.

10. The method of claim 5, wherein the media device control profile comprises information mapping a particular input from one or more input devices to a particular control data output, the particular control data output configured to control the one or more media devices.

11. The method of claim 5, wherein the media device control profile comprises a designation of a communication path for use while communicating with the particular media device, wherein the communication path specifies one or more of communication interface, frequency, or communication protocol; and
wherein the sending uses the designated communication path.

12. The method of claim 11, wherein the communication protocol comprises at least a portion of an 802.15.1 standard, an 802.11 standard, or both, as promulgated by the Institute of Electrical and Electronics Engineers ("IEEE").

13. The method of claim 5, wherein the media device state data for one of the media devices is indicative of a high-definition multimedia interface ("HDMI") input source selected for use by the media device.

14. A computer-implemented method comprising:
accessing media device state data stored in one or more memories, wherein the media device state data is indicative of a first media device in physical proximity to a second media device, wherein the first media device is in communication with the second media device;
determining a media device control profile based at least in part on the media device state data;
configuring a processor to generate control data configured to initiate one or more actions by the first media device, wherein the control data is based at least in part on one or more inputs from one or more input devices and the media device control profile; and
based at least in part on the media device control profile, configuring one or more communication interfaces to establish one or more communication paths between the first media device and the second media device.

15. The method of claim 14, further comprising:
sending one or more interrogation requests to one or more of the first media device or the second media device for the media device state data; and
based at least in part on responses or non-responses to the interrogation requests, updating the media device state data stored in the one or more memories.

16. The method of claim 14, further comprising:
receiving input from the one or more input devices;
based at least in part on the input, generating the control data configured to initiate one or more actions by one or more of the first media device or the second media device;
establishing the one or more communication paths; and
sending the control data to one or more of the first media device or the second media device using the one or more communication paths.

17. The method of claim 16, the input comprising one or more of:
one or more motions,
one or more gestures,
one or more uttered sounds,
one or more button activations, or
absence of the one or more motions, the one or more gestures, the one or more uttered sounds, or the one or more button activations.

18. The method of claim 14, wherein the configuring the one or more communication interfaces comprises establishing a device pairing between two devices compliant with at least a portion of the 802.15.1 standard as promulgated by the Institute of Electrical and Electronics Engineers ("IEEE"), or associating with another device compliant with at least a portion of an 802.11 standard of the IEEE.

19. The method of claim 14, wherein the control data comprises one or more sequences compliant with at least a portion of the Consumer Electronics Control standard, the one or more sequences configured to initiate one or more actions when processed by one or more of the first media device or the second media device.

20. The method of claim 14, further comprising:
setting a keepalive transmission time interval based at least in part on the media device state data; and
sending keepalive transmissions separated by the keepalive transmission time interval to one or more of the first media device or the second media device using the one or more communications paths.

* * * * *